United States Patent [19]

Florida

[11] Patent Number: 5,082,391
[45] Date of Patent: Jan. 21, 1992

[54] SELF-ALIGNING QUICK DISCONNECT COUPLING

[75] Inventor: William F. Florida, Fresno, Calif.

[73] Assignee: FMC Corporation, Chicago, Ill.

[21] Appl. No.: 752,984

[22] Filed: Sep. 3, 1991

Related U.S. Application Data

[63] Continuation of Ser. No. 611,221, Nov. 9, 1990, abandoned.

[51] Int. Cl.$^5$ .............................................. F16B 7/18
[52] U.S. Cl. ..................................... 403/342; 285/38; 285/184; 285/325; 285/334.4; 285/387
[58] Field of Search ................. 285/38, 387, 325, 384, 285/184, 334.4; 403/342, 316

[56] References Cited

U.S. PATENT DOCUMENTS

| 189,905 | 4/1877 | Rideout | 285/325 |
|---|---|---|---|
| 763,210 | 6/1904 | Schwamberger et al. | 285/38 X |
| 920,963 | 5/1909 | Keyes | 285/386 X |
| 1,176,261 | 3/1916 | Ziegler | 285/387 X |
| 1,604,211 | 10/1926 | Williams | 285/38 X |
| 2,457,384 | 12/1948 | Krenz | 285/384 X |
| 3,428,337 | 2/1969 | Read | 285/387 X |
| 3,521,910 | 7/1970 | Callahan et al. | 285/328 X |
| 3,600,007 | 8/1971 | Morris | 285/38 X |
| 3,689,110 | 9/1972 | Ferguson | 285/387 X |
| 4,778,204 | 10/1988 | Berger | 285/387 X |

FOREIGN PATENT DOCUMENTS

| 0019038 | 3/1930 | Australia | 403/342 |
|---|---|---|---|
| 0388805 | 1/1924 | Fed. Rep. of Germany | 403/342 |
| 0739586 | 11/1932 | France | 403/342 |
| 0309288 | 11/1955 | Switzerland | 285/261 |
| 0579843 | 8/1946 | United Kingdom | 285/38 |
| 2032035 | 4/1980 | United Kingdom | 285/384 |

Primary Examiner—Dave W. Arola
Attorney, Agent, or Firm—A. J. Moore; R. C. Kamp; R. B. Megley

[57] ABSTRACT

A self-aligning quick connect coupling is disclosed for coupling two rods together having large diameter end portions with end surfaces in the form of spherical sectors. The coupling is formed in two halves threaded together and provides ample clearance for allowing the rods to be coupled together even though not axially aligned. The coupling halves are slotted to permit easy removal of the coupling halves from the rods when being uncoupled.

3 Claims, 2 Drawing Sheets

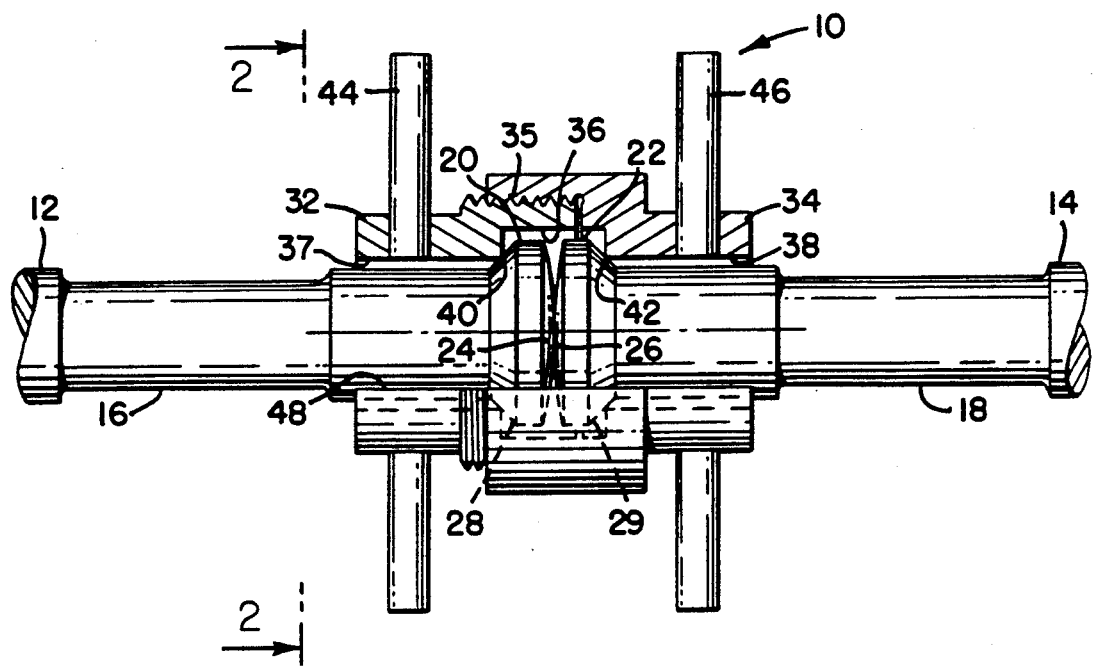
FIG_1
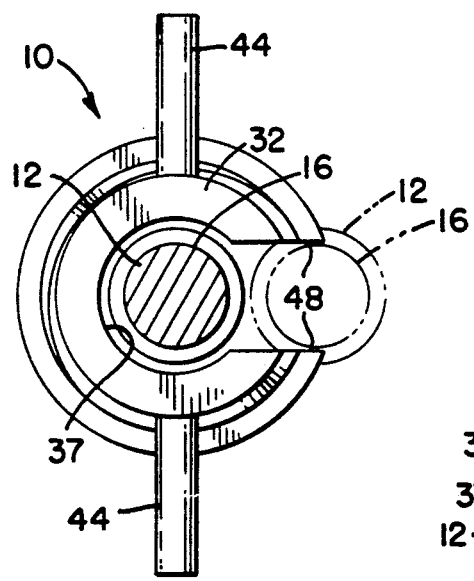
FIG_2
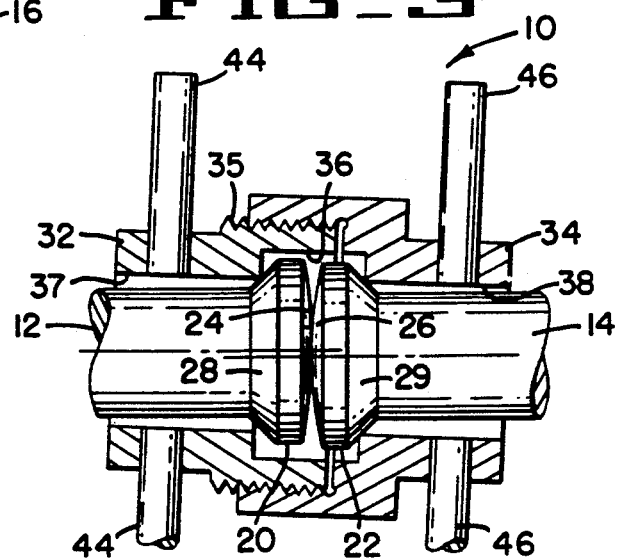
FIG_3

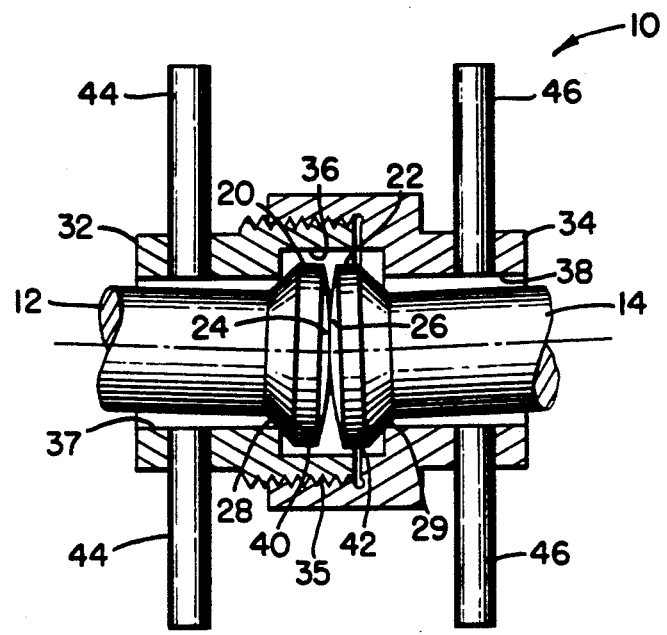
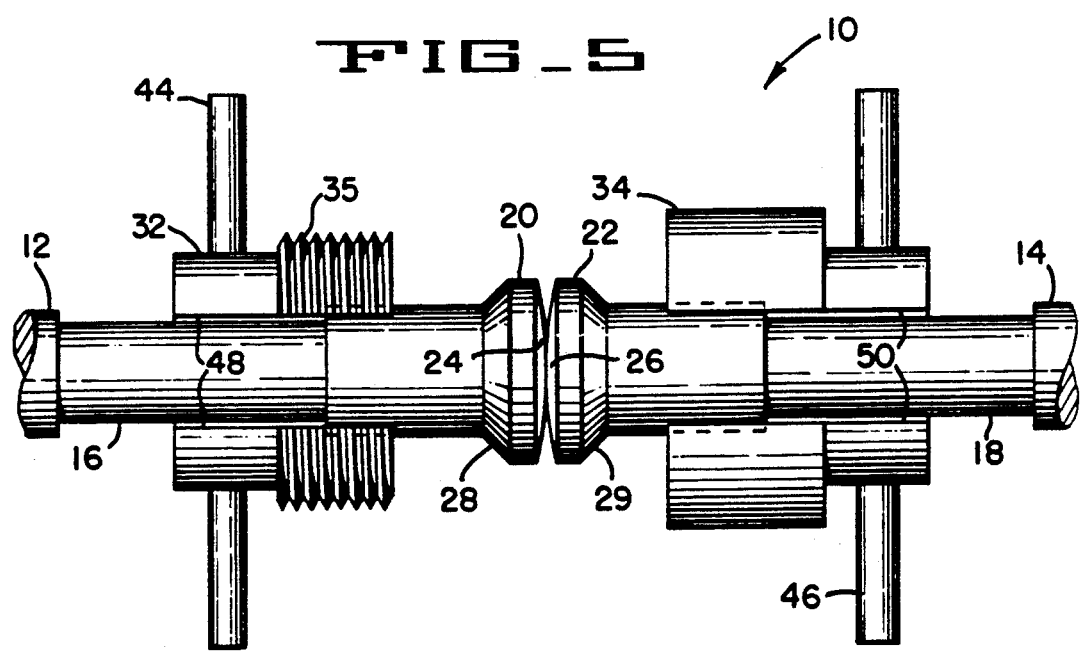

SELF-ALIGNING QUICK DISCONNECT COUPLING

This application is a continuation, of application Ser. No. 07/611,221, filed Nov. 9, 1990, now abandoned.

BACKGROUND OF THE INVENTION

Field of the Invention

The present invention relates to quick disconnect couplings which permit axial misalignment of two rods and further provides for removing two coupling of tools.

SUMMARY OF THE INVENTION

The present invention relates to self aligning, quick disconnect couplings for connecting two rods together, each having a small diameter coupling release portion and a large diameter end portion in the form of a spherical sector. A pair of threaded coupling halves are each longitudinally slotted to permit the coupling halves to be inserted on and removed from the rods when unscrewed and when aligned with small diameter portions of each rod. When the coupling halves are locked together with the aid of pins, the spherical sectors of adjacent rods 12,14 permit the two rods to operate when axially misaligned.

BRIEF DESCRIPTION OF THE DRAWINGS

FIG. 1 is a side elevation with portions of the coupling halves shown in quarter section and with parts of the rods being cut away.

FIG. 2 is a section taken along lines 2—2 of FIG. 1 with the rod shown in full lines in axial alignment with the coupling halves and shown in phantom lines partially released from the coupling halves.

FIG. 3 is a central section similar to FIG. 1 but illustrating the rods out of axial alignment.

FIG. 4 is similar to FIG. 3 but with the rods angled relative to each other.

FIG. 5 is a side elevation similar to FIG. 1 but illustrating the two coupling halves being removed from the rods.

DESCRIPTION OF THE PREFERRED EMBODIMENT

The self-aligning quick disconnect coupling 10 of the present invention comprises a pair of rods 12,14, each having a small or intermediate diameter portion 16,18. Adjacent ends of the rods have large diameter heads 20,22, each having abutting end portions in the form of spherical sectors 24,26. Other surfaces 28,29 of the heads 20,22 are shaped as frustums of a cone.

The self-aligning quick disconnect coupling 10 includes a pair of coupling halves 32,34 which are releasably connected together by threads 35, and together define a large diameter axial bore 36 (FIGS. 1, 3 and 4) which communicate with associated axial bores 37,38 that are slightly larger in diameter than the diameter of the rods 12,14 as best shown in FIGS. 1, 3 and 4 without adversely disrupting the coupling function of the self-aligned quick connect coupling 10. When the coupling halves are connected together by said screw threads as indicated in FIGS. 1 and 4, it will be noted that inner edges 40,42 of the axial bore 36 slidably contact the associated frusto-conical surfaces 28,29 when axially aligned as best shown in FIG. 1.

In order to eliminate the need for tools to connect and disconnect the two coupling halves 32,34 of coupling 10, each coupling half has a pair of pins 44,46 press fitted into the coupling halves 32,34 thus allowing an operator to connect and disconnect the coupling without the aid of tools.

As shown in FIGS. 5, each coupling half 32,34 includes an elongated slot 48,50 that is slightly larger in diameter than the associated small or intermediate diameter portions 16,18 of the rods 12,14 thus allowing the operator (FIGS. 2 and 5) to easily remove the coupling halves 32,34 from the rods 12,14 without altering the position of one or both rods 12,14.

FIG. 3 is an operational view in section illustrating the two rods 12,14 which have their axes parallel to but out of axial alignment with each other causing the coupling 10 to be slightly pivoted relative to the axes of the rods 12,14.

FIG. 4 illustrates the rods 12,14 as being angularly misaligned within the coupling 10.

FIG. 5 illustrates the rods 12,14 with the coupling halves being separated and being removed from the rods 12,14.

From the foregoing description it will be apparent that the self-aligning quick disconnect coupling of the present invention includes a pair of rods, each having small or intermediate diameter portions and large diameter heads with end portions formed as spherical sectors with outer frusto-conical surfaces. When coupled together by the two-piece threaded coupling having an axial slot therein, the pair of rods may remain coupled together even when the rods are axially misaligned, and when the coupling halves are disconnected, the halves may be removed from the rods by means of the small or intermediate diameter slots.

Although the best mode contemplated for carrying out the present invention has been herein shown and described, it will be apparent that modification and variation may be made without departing from what is regarded to be the subject matter of the invention.

What is claimed is:

1. A self-aligning quick connect and disconnect coupling, comprising:

a pair of rods each having a small diameter portion, an intermediate diameter portion, and a pair of large diameter heads in the shape of a spherical sector and having an intermediate portion in the form of a frustum of a cone; and means defining a pair of longitudinally slotted coupling halves threaded together with abutments thereon to engage said heads and retain said heads in said coupling halves and each longitudinally slotted coupling half cooperating to define a rod receiving bore slightly larger than the diameter of said rods and a head receiving bore slightly larger than said large diameter heads for accommodating said large diameter heads of said pair of rods, said longitudinally slotted coupling halves being removable from said pair of rods when unscrewed and moved into axial alignment with said small diameter portions of said pair of rods.

2. An apparatus according to claim 1 wherein said coupling halves when threaded together permit said pair of rods to be operatively coupled together when said rods are out of axial alignment.

3. A self-aligning quick connect and disconnect coupling, comprising:

a pair of rods each having an enlarged annular head in the shape of a spherical sector and having an intermediat portion in the form of a frustum of a cone;

means defining a small diameter intermediate portion in each of said rods; and means defining a pair of coupling halves threaded together when in operative position for coupling said pair of rods together with said spherical sectors contacting each other, and each coupling half having a large diameter bore for encompassing said head with inwardly directed edges contacting said frustum of a cone, means defining a small diameter intermediate portion in each of said rods; and means defining a pair of coupling halves threaded together when in operative position for coupling said pair of rods together with said spherical sectors contacting each other, and each coupling half having a large diameter bore for encompassing said head with inwardly directed edges contacting said frustum of a cone, and an intermediate diameter bore for loosely receiving said associated rods thereby permitting said rods to be selectively positioned in axial alignment with each other, in axial misalignment with each other, and to be angled relative to each other.

* * * * *